United States Patent
Arulambalam et al.

(10) Patent No.: US 7,707,356 B2
(45) Date of Patent: Apr. 27, 2010

(54) METHOD AND APPARATUS FOR SCHEDULING DISK READ REQUESTS

(75) Inventors: Ambalavanar Arulambalam, Macungie, PA (US); Nevin C. Heintze, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 605 days.

(21) Appl. No.: 11/529,001

(22) Filed: Sep. 28, 2006

(65) Prior Publication Data
US 2008/0082739 A1 Apr. 3, 2008

(51) Int. Cl.
*G06F 12/00* (2006.01)

(52) U.S. Cl. .................. 711/112; 711/158; 711/163; 369/30.23; 369/30.36

(58) Field of Classification Search .............. 711/112, 711/158, 163; 369/30.23, 30.36
See application file for complete search history.

(56) References Cited

U.S. PATENT DOCUMENTS

| | | | | |
|---|---|---|---|---|
| 5,432,922 A | * | 7/1995 | Polyzois et al. | 714/6 |
| 5,557,770 A | * | 9/1996 | Bhide et al. | 711/161 |
| 5,606,679 A | * | 2/1997 | Cohn et al. | 711/4 |
| 5,666,532 A | * | 9/1997 | Saks et al. | 707/205 |
| 6,055,646 A | * | 4/2000 | Uchihori et al. | 714/6 |
| 2003/0200384 A1 | * | 10/2003 | Edanami | 711/112 |

OTHER PUBLICATIONS

Tanenbaum, "Structured Computer Organization, 3rd Ed.", p. 11, 1990.*

* cited by examiner

*Primary Examiner*—Stephen C Elmore
(74) *Attorney, Agent, or Firm*—Ryan, Mason & Lewis, LLP

(57) ABSTRACT

Methods and apparatus are provided for reducing disk seek time to improve the overall throughput by improving the scheduling of read requests. One or more requests to read data from one or more disks are scheduled by suspending one or more requests to read data from the disk for a predefined period of time. The read suspension can be initiated, for example, in response to a request to read data from the disk, such as a speculative read operation. The predefined period of time may be approximately equal, for example, to an expected duration of the read request operation, an expected seek time, a predefined recovery time or a time since a last request less a recovery time. The read suspension can be conditioned upon one or more predefined criteria, such as a disk bandwidth threshold being satisfied, a time since a last request threshold being satisfied and a condition that only a request for a different stream than a currently requested stream is suspended.

22 Claims, 2 Drawing Sheets

```
scheduler() {
while (true) do {
    wait(T_p);
    halt new read requests for T_r
    }
}
```

FIG. 3

```
read_request() {
    if ((bandwidth < alpha * max_bandwidth) && (time_since_last_request < T_r)) {
        wait(time_since_last_request - T_r);
    }
    issure_read_request;
}
```
- 310: if ((bandwidth < alpha * max_bandwidth) && (time_since_last_request < T_r)) {
- 320: wait(time_since_last_request - T_r);

FIG. 4

```
read_request() {
    if ((bandwidth < alpha * max_bandwidth)
        && (time_since_last_request < T_r)
        && (time_request_stream != last_request_stream)) {
        wait(time_since_last_request - T_r);
    }
    issure_read_request;
}
```
- 410: if ((bandwidth < alpha * max_bandwidth) && (time_since_last_request < T_r)
- 420: && (time_request_stream != last_request_stream)) {
- 430: wait(time_since_last_request - T_r);

FIG. 5

```
read_request() {
    issue_read_request;
    if (this_request_is_part_of_a_stream
        && (last_request_for_this_stream_required_disk_seek))
        wait(T_r);
}
```
- 510: if (this_request_is_part_of_a_stream && (last_request_for_this_stream_required_disk_seek))

METHOD AND APPARATUS FOR SCHEDULING DISK READ REQUESTS

FIELD OF THE INVENTION

The present invention is related to techniques for managing the reading and writing of data to a hard disk drive and, more particularly, to techniques for overcoming the cost of seek time.

BACKGROUND OF THE INVENTION

In order to read or write data to a hard disk, the disk micro-controller must first physically position the disk head at the appropriate place on the disk platter(s) where the data is to be read or written. During this time, no data transfer can happen, and seek time is essentially wasted time. Thus, the management of seek time is an important factor in the overall throughput of read and write operations to a hard disk.

A number of techniques have been proposed or suggested for the management of seek time. For example, the total amount of seek time can be minimized by ensuring that each read or write operation transfers a large amount of data. Although this technique reduces the number of disk seeks required, and improves overall throughput, it is often impractical. A number of hard disk controllers employ a cache memory to improve the performance of read and write operations. The goal of the cache memory is to hide the disk seek time by effectively re-ordering read and write operations so that consecutive operations require little or no seek time.

Data from incoming write operations are usually written to the cache first, and then written to the disk at an appropriate time. This allows the micro-controller to re-order the write operations and change the timing of the write operations to minimize the disk seek time and thereby improve the overall throughput. For example, operations that physically access "similar locations" on the disk should be grouped together.

The use of the cache for read operations is also important. Typically, the disk micro-controller will observe the pattern of read operations, predict likely future read requests, and then speculatively (and efficiently) read large chunks of data into the cache when the disk is otherwise idle. The cache is usually managed as a set of "segments," with each segment having a specific purpose and being managed independently.

This speculative read-ahead works especially well when a single stream of data is read from consecutive sectors on the disk. The disk seek time is minimized and the performance approaches the maximum theoretical disk bandwidth. If a second stream of consecutive sector reads is added, however, the performance often drops significantly, depending on the transfer size of each operation. For example, if a request for a first stream is received, the controller will move the head to read the data from the first stream and then read and return the data for the first stream. Thereafter, the controller is idle and will start a speculative read of data for the first stream. Meanwhile, assume that a request for a second stream is received during the speculative read of the first stream. The controller will abort the speculative request (since actual requests take precedence over speculative reads), move the head to read the data from the second stream and then read and return the data for the second stream.

The disk will keep moving the head from one position to another in this manner as it aborts speculative read operations in favor of actual requests. Thus, the aborted speculative read ahead operations will be ineffective towards minimizing disk seek time. In effect, the disk seek time will dominate and the benefit of the read cache is significantly impaired. A need therefore exists for methods and apparatus for reducing disk seek time to improve the overall throughput. A further need exists for methods and apparatus for scheduling read requests.

SUMMARY OF THE INVENTION

Generally, methods and apparatus are provided for reducing disk seek time to improve the overall throughput by improving the scheduling of read requests. According to one aspect of the invention, one or more requests to read data from one or more disks are scheduled by suspending one or more requests to read data from the disk for a predefined period of time. The read suspension can be initiated, for example, in response to a request to read data from the disk, such as a speculative read operation. The predefined period of time may be approximately equal, for example, to an expected duration of the read request operation, an expected seek time, a predefined recovery time or a time since a last request less a recovery time.

According to a further aspect of the invention, the read suspension can be conditioned upon one or more predefined criteria. For example, the predefined criteria can include a disk bandwidth threshold being satisfied, a time since a last request threshold being satisfied and a condition that only a request for a different stream than a currently requested stream is suspended.

A more complete understanding of the present invention, as well as further features and advantages of the present invention, will be obtained by reference to the following detailed description and drawings.

BRIEF DESCRIPTION OF THE DRAWINGS

FIG. 1 illustrates a disk system incorporating features of the present invention; and FIGS. 2 through 5 provide illustrative pseudo-code for exemplary implementations of the read request scheduling process of FIG. 1.

DETAILED DESCRIPTION

Figures 1, 2:
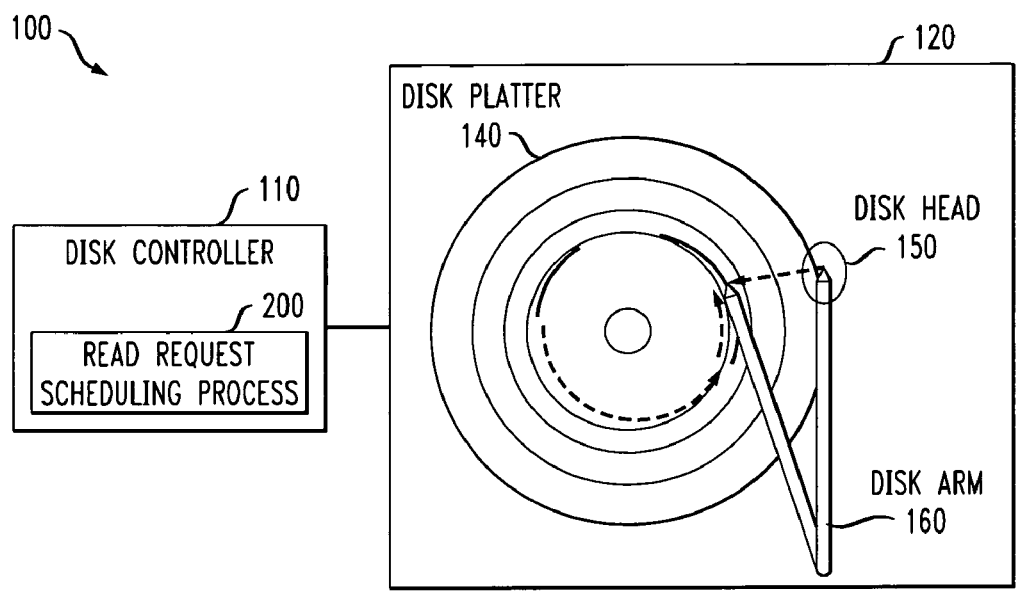

The present invention provides methods and apparatus for scheduling read requests that reduce the disk seek time to improve the overall throughput. The present invention significantly improves performance when disks preempt read ahead over new requests.

FIG. 1 illustrates a disk system 100 incorporating features of the present invention. The disk system 100 may be, for example, part of a network attached storage (NAS) system. As shown in FIG. 1, a disk controller 110 controls a disk assembly 120. The disk assembly 120 is comprised of one or more disk platters 140, a disk head 150 and a disk arm 160, in a known manner.

Generally, the disk controller 110 transfers data between a main memory (not shown) and the disk assembly 120 in a known manner by selecting the appropriate platter 140 and moving the disk arm 160 to position the disk head 150 over the cylinder (track) on which the appropriate block (consisting of one or more sectors) is located. The time between issuing a disk request and the time when the requested block is resident in memory is called the disk latency or disk access time. The disk access time is comprised of the seek time, rotational delay, transfer time and other delays. The seek time is the time required to position the head 150. The head 150 requires a minimum amount of time to start and stop moving the head, as well as some time to physically move the head 150.

According to one aspect of the invention, the disk controller 110 employs a read request scheduling process 200, discussed further below in conjunction with FIG. 2. As previously indicated, when a disk controller 110 is reading multiple streams of data from the disk 120, the speculative read-ahead technique is significantly impaired. In particular, if the controller 110 is speculatively reading a first stream and a request for a second stream is received during the speculative read of the first stream, the controller 150 aborts the speculative request (since actual requests take precedence over speculative reads) to begin reading the requested second stream. The aborted speculative read ahead operations are thus ineffective towards minimizing disk seek time.

Generally, the read request scheduling process 200 employs a systematic scheduling mechanism to control or slow-down the rate at which read requests are presented to the disk 120. The present invention recognizes that, although counter-intuitive, pauses between read requests can significantly increase the overall system throughput because the pauses allow the disk to complete the speculative pre-fetch before another request is received for another stream.

In one exemplary embodiment, the read request scheduling process 200 periodically suspends new requests for a predefined period of time. For example, during a speculative read operation, the read request scheduling process 200 can suspend new requests for an amount of time that will allow the pre-fetch operation to complete (approximately a disk seek time). In this manner, the read request scheduling process 200 alters the "rate of arrival" of read requests at the disk assembly 120 to ensure that the pre-fetching finishes.

FIG. 2 provides illustrative pseudo-code for an exemplary implementation of the read request scheduling process 200. As shown in FIG. 2, the read request scheduling process 200 includes a wait statement 210 that controls the frequency with which the read requests are suspended in accordance with the present invention. Thus, after each predefined period, T-p, a halt statement 220 executes that suspends further read operations for a recovery time, T_r, that allows the pre-fetching to complete before the next read request is issued. The period, T_p, controls how often the halt statement is executed, and may be, for example, 10-1000 disk seek times (i.e., 100 ms to 10 s). As shown in FIGS. 2-5, the recovery time, T_r, determines the duration of each suspension and is typically equal to one disk seek time (5 ms-20 ms).

FIG. 3 provides illustrative pseudo-code for an alternative implementation of a read request scheduling process 300. As shown in FIG. 3, the read request scheduling process 300 includes a monitoring element that more intelligently controls the request pause mechanism, for example, based on factors such as disk bandwidth and time since last request. The variable alpha is a fraction of the maximum bandwidth (typically around 0.5). As shown in FIG. 3, the pseudo-code 300 includes a statement 310 that includes one or more conditions that determine when the read suspension is triggered. In the exemplary embodiment shown in FIG. 3, the statement 310 includes two conditions based on predefined thresholds for disk bandwidth and the time since the last request. The read suspension in statement 320 is not executed until both conditions are satisfied. The read request scheduling process 300 will only halt further read requests during step 320 for a duration equal to the time since the last request less the recovery time, and only if the disk bandwidth and time since last request satisfy predefined criteria.

FIG. 4 provides illustrative pseudo-code for yet another implementation of a read request scheduling process 400. The read request scheduling process 400 extends the read request scheduling process 300 of FIG. 3 to include a mechanism 420 that only pauses requests that are for different "streams" (since requests for the same stream do not cause problems). As shown in FIG. 4, the read request scheduling process 400 includes a statement 410 that includes two exemplary conditions that determine when the read suspension is triggered, as discussed further below in conjunction with FIG. 4. In addition, the embodiment shown in FIG. 4 includes include a statement 420 that only pauses requests that are for different "streams" than the stream currently undergoing a speculative read operation (since requests for the same stream do not cause problems).

The read suspension in statement 430 is not executed until both conditions in statement 410 are satisfied and statement 420 determines that the read request is for a different "stream." The read request scheduling process 400 will only halt further read requests during step 430 for a duration equal to the time since the last request less the recovery time, and only if the conditions of statements 410 and 420 are satisfied.

FIG. 5 provides illustrative pseudo-code for a response time evaluation process 500. The response time evaluation process 500 measures response times to determine whether the disk is doing seek operations for every read of a stream. As shown in FIG. 5, the process 500 determines during step 510 if a new request is for a stream that required a seek operation on the last request. The variable last_request_required_disk_seek in statement 510 is true if the time taken to do the last request is greater than the expected time to read the data from cache. In this manner, if in the middle of a stream of read requests (so another read request from the same stream is expected to follow this one) and the data for the last read operation was not in cache, the process 500 waits sufficient time to read the data into the cache for this stream.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for scheduling one or more requests to read data from one or more disks, comprising the step of:
    scheduling one or more requests to read data from said one or more disks; and
    suspending one or more of said requests to read data from said one or more disks for a predefined period of time.

2. The method of claim 1, wherein said suspending step is initiated in response to said request to read data from said one or more disks.

3. The method of claim 2, wherein said request is a speculative read operation to read data from said one or more disks.

4. The method of claim 1, wherein said predefined period of time is approximately equal to an expected duration of a speculative read operation.

5. The method of claim 1, wherein said predefined period of time is approximately equal to an expected seek time.

6. The method of claim 1, wherein said predefined period of time is a predefined recovery time.

7. The method of claim 1, wherein said predefined period of time is a time since a last request less a recovery time.

8. The method of claim 1, wherein said suspending step is conditioned upon one or more predefined criteria.

9. The method of claim 8, wherein said one or more predefined criteria comprises a disk bandwidth threshold being satisfied.

10. The method of claim 8, wherein said one or more predefined criteria comprises a time since a last request threshold being satisfied.

11. The method of claim 8, wherein said one or more predefined criteria comprises a condition that only a request for a different stream than a currently requested stream is suspended.

12. A system for scheduling one or more requests to read data from one or more disks, comprising:
    a memory; and
    at least one processor, coupled to the memory, operative to:
    schedule one or more requests to read data from said one or more disks; and
    suspend one or more requests to read data from said one or more disks for a predefined period of time.

13. The system of claim 12, wherein said suspending step is initiated in response to said request to read data from said one or more disks.

14. The system of claim 13, wherein said request is a speculative read operation to read data from said one or more disks.

15. The system of claim 12, wherein said predefined period of time is approximately equal to one or more of an expected duration of said read request operation, an expected seek time, a predefined recovery time and time since a last request less a recovery time.

16. The system of claim 12, wherein said suspending step is conditioned upon one or more predefined criteria.

17. The system of claim 16, wherein said one or more predefined criteria comprises one or more of a disk bandwidth threshold being satisfied, a time since a last request threshold being satisfied and a condition that only a request for a different stream than currently requested stream is suspended.

18. An article of manufacture for scheduling one or more requests to read data from one or more disks, comprising a machine readable storage medium containing one or more programs which when executed implement the step of:
    scheduling one or more requests to read data from said one or more disks; and
    suspending one or more requests to read data from said one or more disks for a predefined period of time.

19. The article of manufacture of claim 18, wherein said suspending step is initiated in response to said request to read data from said one or more disks.

20. The article of manufacture of claim 19, wherein said request is a speculative read operation to read data from said one or more disks.

21. The article of manufacture of claim 18, wherein said suspending step is conditioned upon one or more predefined criteria.

22. The article of manufacture of claim 21, wherein said one or more predefined criteria comprises one or more of a disk bandwidth threshold being satisfied, a time since a last request threshold being satisfied and a condition that only a request for a different stream than a currently requested stream is suspended.

* * * * *